(12) United States Patent
Mauger et al.

(10) Patent No.: US 6,507,577 B1
(45) Date of Patent: Jan. 14, 2003

(54) VOICE OVER INTERNET PROTOCOL NETWORK ARCHITECTURE

(75) Inventors: Roy Harold Mauger, Radlett; Gary Robert Kirkpatrick, Harlow; Mark Robert Gibson, Bishop's Stortford, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/190,082

(22) Filed: Nov. 12, 1998

(51) Int. Cl.[7] .......................... H04L 12/66; G06F 15/16
(52) U.S. Cl. ........................................ 370/356; 709/227
(58) Field of Search .................................. 370/351–356, 370/389, 395–401, 464–467, 469, 474, 395.1; 709/227–229

(56) References Cited

U.S. PATENT DOCUMENTS 5,918,019 A * 6/1999 Valencia ..................... 709/227
6,070,192 A * 5/2000 Holt et al. ................... 709/227
6,084,956 A * 7/2000 Turner et al. ................ 379/230
6,094,437 A * 7/2000 Loehndorf, Jr. et al. ..... 370/420
6,349,336 B1 * 2/2002 Sit et al. ...................... 709/227

FOREIGN PATENT DOCUMENTS

| EP | 0 776 107 | 5/1997 |
| EP | 0 912 027 | 4/1999 |
| WO | WO 98/39934 | 9/1998 |
| WO | WO 98/54913 | 12/1998 |

* cited by examiner

*Primary Examiner*—Kwang Bin Yao
*Assistant Examiner*—Kevin C. Harper
(74) *Attorney, Agent, or Firm*—Lee, Mann, Smith, McWilliams, Sweeney & Ohlson (57) ABSTRACT

Voice and media services are provided over an IP network incorporating a plurality of nodes and in which connection oriented traffic is transported in tunnels via said nodes. SS7 signalling is provided between nodes. The voice and media components are multiplexed to form a point to point protocol (PPP) session which is switched end to end across the network under the control of the signalling.

13 Claims, 7 Drawing Sheets

LAC  L2TP Access Concentrator
LNS  L2TP Network Server

VOIP

VOICE OVER INTERNET PROTOCOL NETWORK ARCHITECTURE

This invention relates to systems and methods for providing and managing Internet protocol (IP) connection oriented services.

BACKGROUND OF THE INVENTION

The Internet Protocol was initially defined for connectionless services. These services normally operate on a best effort basis. There is now a keen interest in the provision of voice services over the Internet where costs are significantly less than those associated with the conventional PSTN. However, the adaptation of what is effectively a high priority connection oriented service to a 'best effort' connectionless or packet system has introduced a number of significant problems. In particular, if an Internet voice service is to obtain universal acceptance, it must provide a quality of service similar to that currently provided by conventional voice networks.

A number of workers are currently addressing this problem. For example, the current Internet Ipv4 protocol includes a TOS (type of service) octet, and Ipv6 a traffic class octet which allows a number of priority levels to be defined to support some degree of traffic engineering in an IP network. The IETF Differentiated Services Working Group has recently defined a method whereby traffic is classified at a priority level and is policed on entry to an IP network. Traffic behaviour on internal links (per hop behaviour) is specified. It is expected that using these methods then service level agreements can be offered to users provided that the number of internal hops is low and also provided that the percentage of high priority traffic is a small percentage of the total traffic.

Other IETF Working Groups have defined protocols providing some degree of connection orientation. These are:

Multi Protocol Label Switching (MPLS) includes the ability to tunnel through many routing stages and to do so using explicit routing rather than hop-by-hop routing. This is a form of connection orientation.

Layer 2 Tunnelling Protocol (LTP) provides a signalling system to dynamically create and delete IP point to point protocol (PPP) sessions end to end across a tunnel. These sessions are allocated bandwidth, are timed for billing purposes, and are explicitly deleted on completion. This is a fully connection oriented paradigm.

Connection orientation is of particular value in the provision of carrier network services to individual users or to user networks. In particular it simplifies the tasks of:

Guaranteeing bandwidth.
Ensuring Quality of service.
Authenticating end user identities.
Preventing fraudulent access or misuse of resources.

Existing Layer 2 networks such as Frame Relay or ATM are able to provide an effective control framework to provide bandwidth accounting however their control protocols are not sufficiently integrated into the Layer 3 IP network functionality to ensure that QoS characteristics of user services are maintained. This has limited the exploitation of this characteristic and has thus failed to resolve the provision of QoS in the Internet.

Reference is here directed to our co-pending application of even date (reference ID1068), the contents of which are incorporated herein by reference, which relates to a network architecture in which a network of layer 2 protocol (L2TP) tunnel switches provides an end of end connection oriented operation for PPP sessions.

SUMMARY OF THE INVENTION

An object of the invention is to minimise or to overcome the above disadvantage.

In addition it is recognised that ITU Signalling System No 7 (SS7) is of considerable value in Voice over IP networks as it allows access to Intelligent Network applications of the PSTN/ISDN and also provides service transparency whereby services such as Call Waiting can operate consistently for ISDN to ISDN, VoIP to ISDN and VoIP to VoIP calls.

In a first aspect, the invention provides an arrangement for providing voice and media service components over an IP network incorporating a plurality of nodes and in which connection oriented traffic is transported in tunnels via said nodes, the arrangement comprising means for providing signalling between said nodes, and means for multiplexing the voice and media components to form a point to point protocol (PPP) session, and means for switching said PPP session end to end across the network under the control of said signalling.

In another aspect, the invention provides a method of providing voice and media service components over an IP network incorporating a plurality of nodes, the method comprising providing signalling between said nodes, and multiplexing the voice and media components to form a point to point protocol (PPP) session which session is switched end to end across the network under the control of said signalling.

Preferably, the signalling comprises SS7 signalling.

Typically, the network tunnels comprise Layer 2 Tunnelling Protocol (L2TP) tunnels and Multi Protocol Label Switching (MPLS) tunnels.

In a preferred embodiment, gatekeepers are provided at either end of each tunnel so as to control the number of calls admitted to that tunnel. This enables the provision of quality of service guarantees to the admitted traffic.

This invention thus provides a network architecture for Voice over IP services in which e.g. SS7 signalling is used between Voice over IP nodes and the media components between the VoIP terminals are multiplexed to form a PPP Session which is switched end to end across the wide area network.

BRIEF DESCRIPTION OF THE DRAWINGS

A preferred embodiment of the invention will now be described with reference to the accompanying drawings in which.

DESCRIPTION OF PREFERRED EMBODIMENT

Reference will first be made to FIGS. 1 to 3a which are introduced for comparative and explanatory purposes, and for the purpose of facilitating a fuller understanding of the invention.

Figure 1:
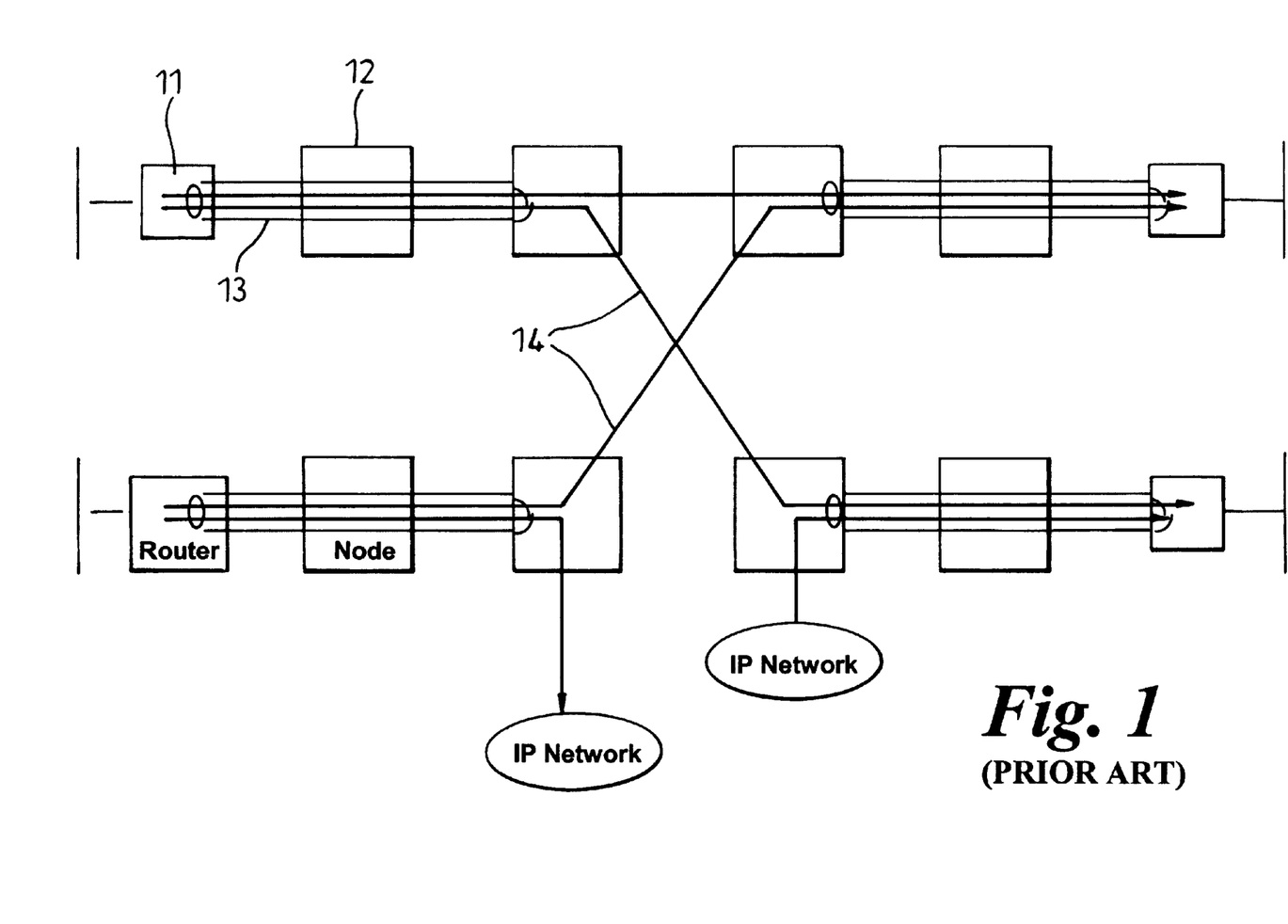
FIG. 1, illustrates the MPLS mechanisms for tunnelling and explicit routing.

Referring to FIG. 1, which is introduced for explanatory and comparative purposes, this shows a prior art MPLS network. The network comprises a number of MPLS edge routers 11 and MPLS switching nodes 12. Such a network allows tunnels to be defined and used for explicit end to end routing of packets. Packet traffic contained within a tunnel passing through a switching node is effectively ignored by that node as far as routing is concerned. The tunnels can be defined at several layers, and tunnels of one layer can be carried within tunnels of other layers. For the purpose of illustration, engineering tunnels 13a, 13b etc. are defined for an engineering layer which is used to divide up capacity in the physical network, and user tunnels 14, which utilise capacity of the engineering tunnels, are defined in order to provide end user services. An engineering tunnel may of course accommodate a number of user tunnels, and a user tunnel will, in general, pass through more than one engineering tunnel. As shown in FIG. 1, the user tunnel 14 is contained in the engineering tunnels 13a and 13b. A typical end user service would be a guaranteed bandwidth service between two VPN user nodes.

In the network of FIG. 1, an engineering tunnel is a permanent or semi-permanent entity that is set up across a number of network nodes, but which does not in general provide a complete end to end route across the network. A user tunnel is a temporary entity that is set up within an appropriate number of engineering tunnels to provide end to end connectivity for the duration of a network transaction, and which is torn down when that transaction has been completed. The purpose of a tunnel is to facilitate routing of packets. A packet within a tunnel can pass through a node without that node needing to have any knowledge of the destination of that packet, nor even of the next node at which the packet will arrive, as the packet can remain within the tunnel until emerging at its final destination. The only information required by the node is the identity of the tunnel via which the packet is transported. It will be understood that an IP network incorporating the tunnel concept may carry both tunnelled packet traffic and conventional packet traffic that is routed at each system node through which it passes.

Figure 2:
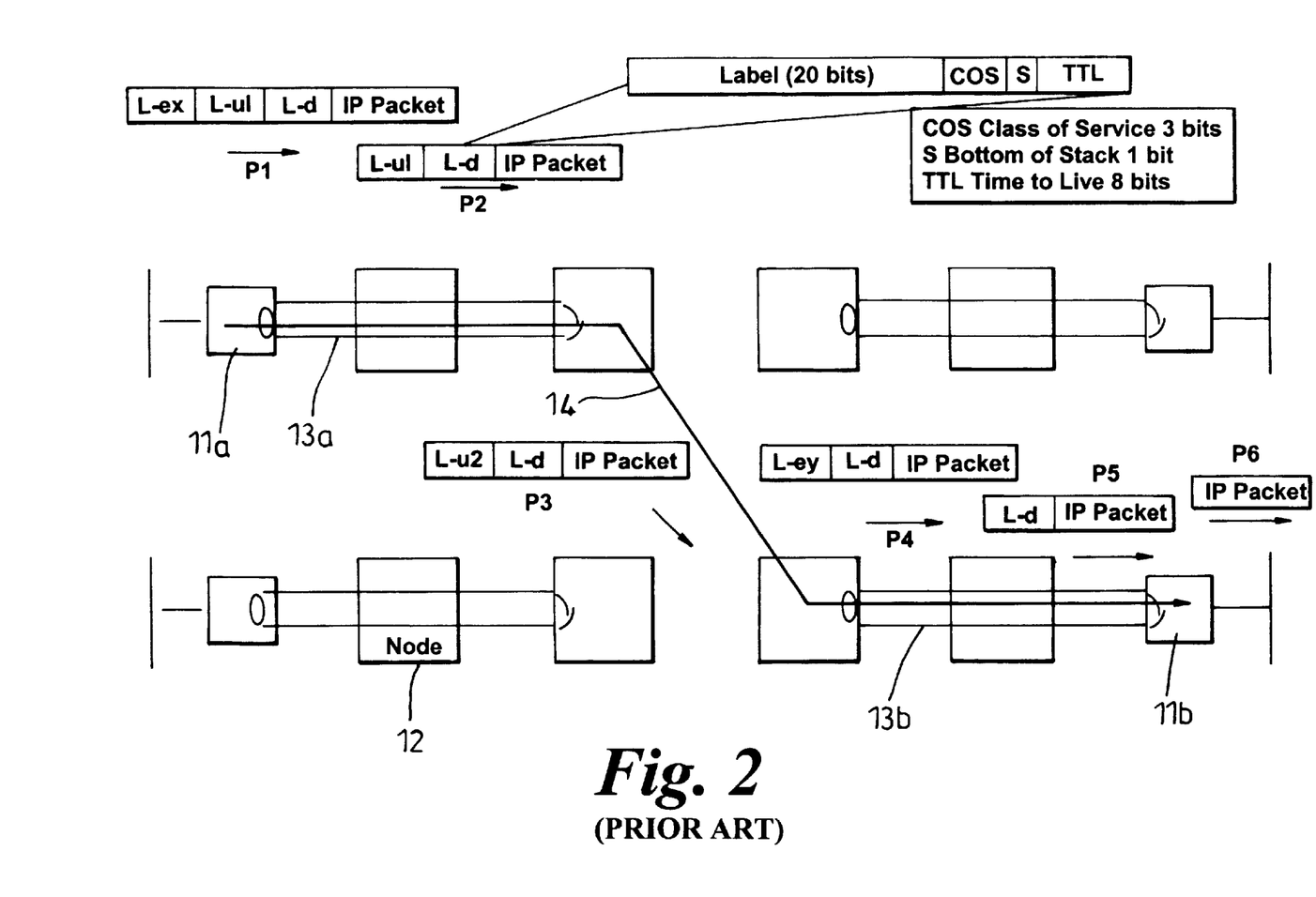
FIG. 2 illustrates the MPLS label processing functions performed in routing a packet through an example connection oriented tunnel of FIG. 1.

The multi protocol label switching (MPLS) operation of the network of FIG. 1 is depicted in FIG. 2 which illustrates the typical packet format P1–P6 at each of the stages in the routing of an IP packet payload end to end across the network of FIG. 1. A typical MPLS packet comprises the original IP packet together with a stack of labels which are used by the MPLS nodes 12 through which the packet passes to control the onward routing of the packet. At each node, the current packet label is used to determine the onward routing of the packet, i.e. the tunnel to which the packet is allocated. The labels are typically each of 4 bytes length comprising a 20 bit label value, a 3 bit class of service field, used to maintain QoS differentiation, a 1 bit "bottom of stack" indicator and an 8 bit "time to live" field, which is used to detect packet forwarding loops.

The packet formats P1–P6 are selected in order to achieve explicit forwarding of the packet over a user tunnel which is itself contained within first and second engineering tunnels in order to reach the destination edge router. MPLS is designed such that it is possible, at each node, to forward the packet based on the label at the top of the stack.

As shown in FIG. 2, the packet format P1 has labels L-d, L-u1, and L-ex. The label L-d is significant to the destination edge router 11b and is a label exchanged by the label distribution protocol over the user tunnel.

L-u1 is the first label of a series used for the user tunnel and is exchanged over the first engineering tunnel 13a. L-ex is a label for the engineering tunnel 13a.

The packet format P2 is used by the first node 12 to determine that this is the penultimate node for the first engineering tunnel 13a. This leads to a "pop" of the stack so that the labels L-d and L-u1 are forwarded to the next node. It will be understood that the term "popping" of a label stack refers to the removal of the label currently at the head of the stack, and that the term "pushing" of a label refers to the addition of a label to the stack.

The label L-u1 of the packet format P3 is used to forward the packet and is translated to the label L-u2 for the next hop.

The label L-u2 of the packet format P4 is used for forwarding. It is determined that this is the penultimate hop from the perspective of the user tunnel so label L-u2 is popped. It is also determined that the second engineering tunnel 13b is used, L-ey being a label for the engineering tunnel 13b. The packet is therefore forwarded with the labels L-d and L-ey.

At the penultimate node of the second engineering tunnel 13b, the label L-ey of the packet format P5 is popped so the packet arrives at the destination edge router 11b with the label L-d only.

At the destination edge router 11b, the original IP packet (format P6) is forwarded to the final destination on the Lan.

Figure 3:
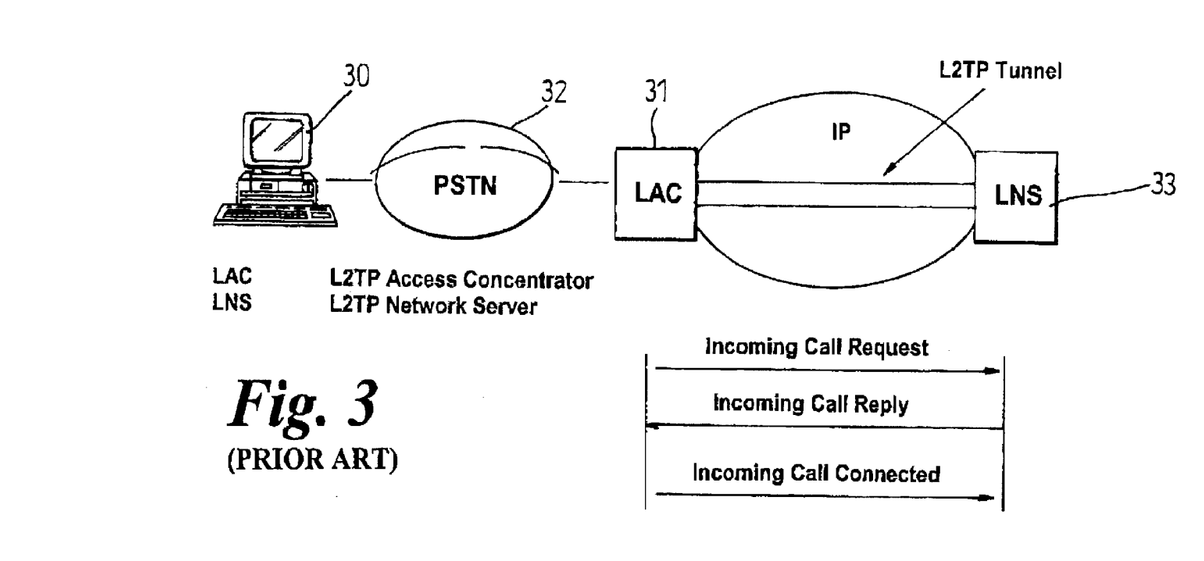
FIG. 3 and FIG. 3a together illustrate the establishment of an IP (PPP) session in an L2TP tunnel.
Figure 3A:
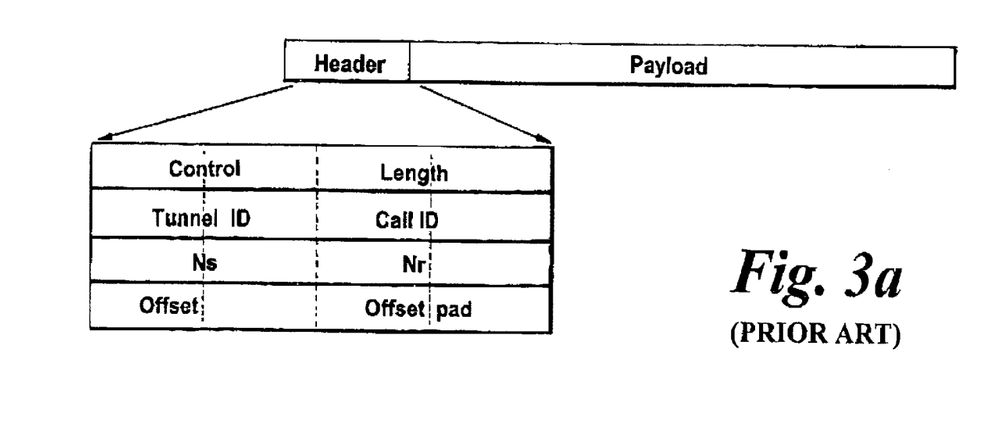

A further example of tunnelling prior art, illustrated for explanatory and comparative purposes in FIGS. 3 and 3a, is the layer 2 tunnelling Protocol (L2TP). L2TP is used for dial-up services where the point of network service is different from the point at which the original dialup call is made. An example is Internet service provider (ISP) roaming whereby the dialup is terminated at the nearest ISP but the network service is provided by the original or home ISP. L2TP provides a connection signalling mechanism so that point to point protocol (PPP) sessions can be dynamically multiplexed within the tunnel. PPP payload packets have a short header prepended thereto so that the original PPP packets can be identified and forwarded as appropriate.

FIG. 3 further illustrates a new call from a user terminal 30 arriving at a L2TP access concentrator (LAC) 31 from a dial-up modem connection set up via a PSTN 32. The associated messaging is illustrated in FIG. 3a. It is determined that the call is destined for a remote L2TP network server (LNS) 33 coupled to IP network 35. A user tunnel 34 is thus established across the IP network between the concentrator 31 and the remote server 33. An exchange of messages within the L2TP tunnel 34 leads to an allocation of a call ID within the tunnel 34 which can be used to identify packets in both directions related to this call.

Having described the prior art network operation in order to facilitate a fuller understanding of the invention, preferred embodiments of the invention will now be described by way of example with reference to FIGS. 4 to 7 of the accompanying drawings.

Figure 4:
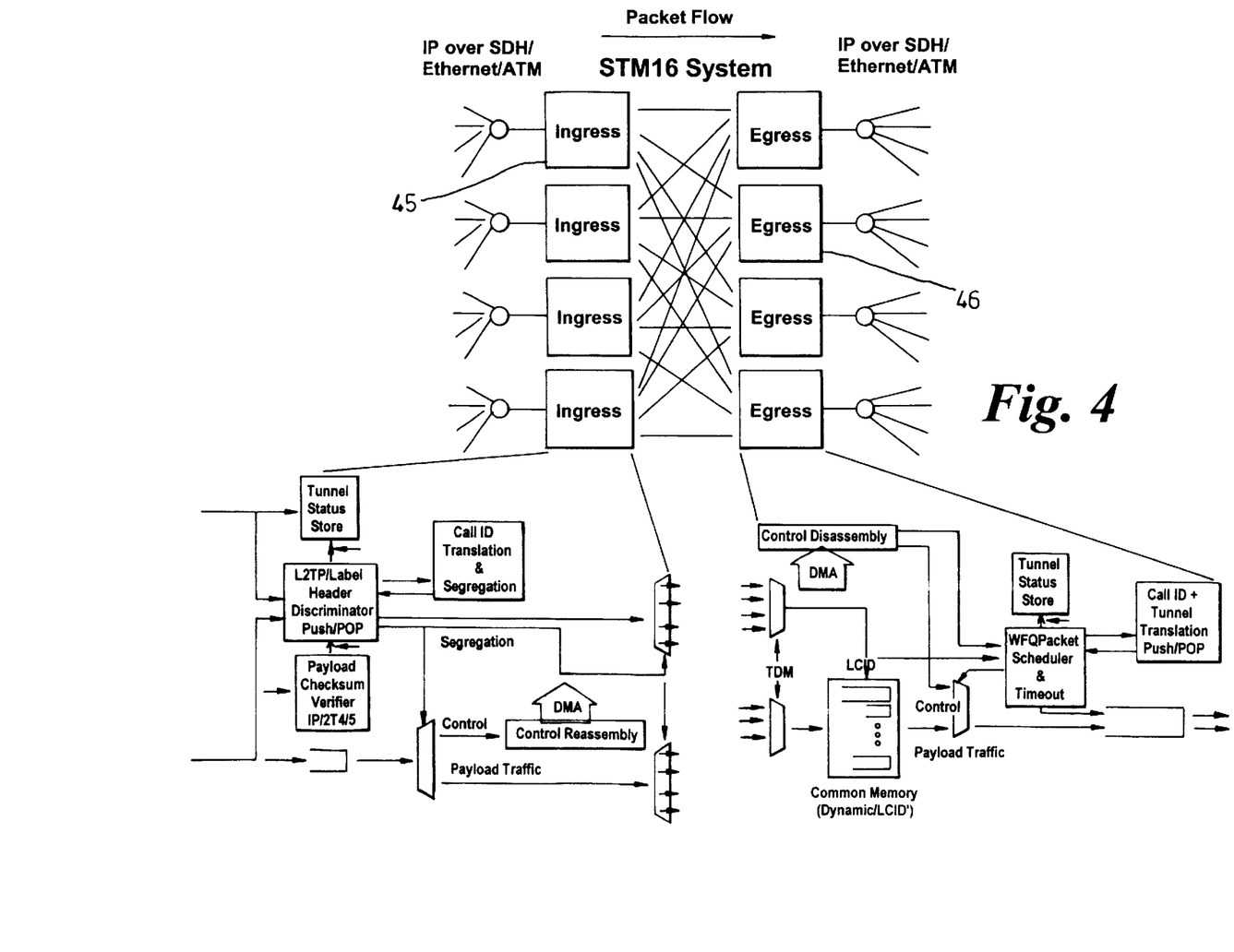
FIG. 4 illustrates a hardware fabric employed in a preferred embodiment of the invention and which is Arranged to operate as a Layer 3 MPLS Router, a Layer 2 MPLS Tunnel Switch and a Layer 2 IP (PPP) Session Switch.

Referring first to FIG. 4, this depicts the inner core and the surrounding circuitry of a router or switch according to a preferred embodiment of the invention. As shown in FIG. 4, the switch incorporates an inner core 40 comprising a set of ingress functions 45 coupled to respective ingress ports 47, and a set of egress functions 46 coupled to respective egress ports 48. Any ingress function can route a received packet to any egress function. The ingress and egress ports coupled to the respective ingress and egress functions handle packet traffic that is routed from node to node, i.e. not contained within a tunnel. Tunnel based traffic is received e.g. from tunnel T41 which either terminates at or passes through the node. The tunnel T41 may be an engineering tunnel accommodating a number of user tunnels.

The lower half of FIG. 4 shows a decomposition of the ingress and aggress functions of the switch. A Tunnel Status store 401 provides an indication of whether the tunnel type is MPLS or L2TP and also the maintenance status of the tunnel. This is used by the L2TP/label header discriminator 402 to access the header information and to execute any required Push/Pop operation. The header information is used to access the Call Id translation and segmentation function 403 in order to identify the required egress function 46 and to modify the L2TP headers for onward transmission. The packet is then forwarded on a link to the required egress function. In the typical switch fabrics, e.g. ATM, the packet will have been segmented for transport purposes. In this case the packet is reassembled in the egress function 46 for egress control purposes, the header of the packet as modified by the ingress function 45 providing all the control information for egress. The tunnel status store 411 discriminates between MPLS and L2TP operation. The header can be further processed by additional push/pop operations or by Tunnel id/Call id translations. The packet is then passed to the scheduler 412 for transmission. Advantageously, the scheduler includes a weighted fair queuing function in order to maintain a fair discard operation in the event of overload.

In the arrangement of FIG. 4, IP packets that are received at the switch from tunnel T41 are output into tunnel T42. If the IP packets are already in MPLS format then they are directly forwarded to the inner core 41 of the switch. For IP Packets which are in their normal format, an additional function, not shown, is required to process the IP address and establish an MPLS label according to the forwarding equivalence class, i.e. the set of IP addresses which share a common MPLS label. The provision of such a function will be understood by those skilled in the art. A switch on a single card is typically made up from four VLSI components, each of which provides 622 MB/s of switching capacity. Each VLSI component comprises an ingress function 45 and an egress function 46. The ingress function 45 processes the initial MPLS label. For normal MPLS packets, a treatment indicator determines whether to PUSH/POP the label stack and/or translate the label. Where the initial MPLS label indicates that an L2TP tunnel is contained within the label, then a second pass is performed interpreting the second header as an L2TP header with its own treatment indicator. The initial ingress function 45 selects an egress port 48 for forwarding. The packet is segmented by the ingress port 44 and forwarded typically as 64 byte segments to the egress port. The egress port reassembles the packet and has an additional treatment indicator, which it uses to prepend the final headers and labels before forwarding the packet on to the next switching node.

The switch architecture of FIG. 4 embodies a connection control architecture which provides a range of connection oriented services in Internet Protocol (IP) networks. This architecture, which applies recursively at multiple levels, can be used to establish engineering tunnels in the physical network and user tunnels within these engineering tunnels. The architecture can also be used to establish PPP Sessions within a succession of L2TP tunnels. The L2TP tunnels can be mapped onto MPLS tunnels, and the MPLS tunnels can hide details of the IP network topology from the L2TP layer network Referring now to FIGS. 5 and 5a, these figures illustrate an exemplary embodiment in which two system nodes generally indicated as 10, each incorporating a respective L2TP tunnel switch 11, are interconnected through an ATM network 12. Each tunnel switch 11 is associated with a respective session manager 13. An application server 14 associated with the TM network 12 operates on a proxy signalling basis and requests point to point protocol (PPP) sessions on behalf of its clients. Each PPP session request identifies its respective endpoints using layer 2 tunnelling protocol (L2TP) addressing With the address space covering a full E164 number. The system operates on a source routed basis as in the case of the ATM Forum PNNI signalling system. The system nodes 10 exchange topology state packets identifying the network topology and reporting on available bandwidth or congestion so that each node has a picture of the current status of the network. For example, a session request (A, B , DTL(N1,N2)) is a request for a PPP session between users A and B with a designated transit list (DTL) for network nodes N1 and N2. The topology state packets that are exchanged between the nodes provide sufficient information on bandwidth availability to ensure that the nodes N1 and N2 have a high probability to provide a successful routing.

Figure 5:
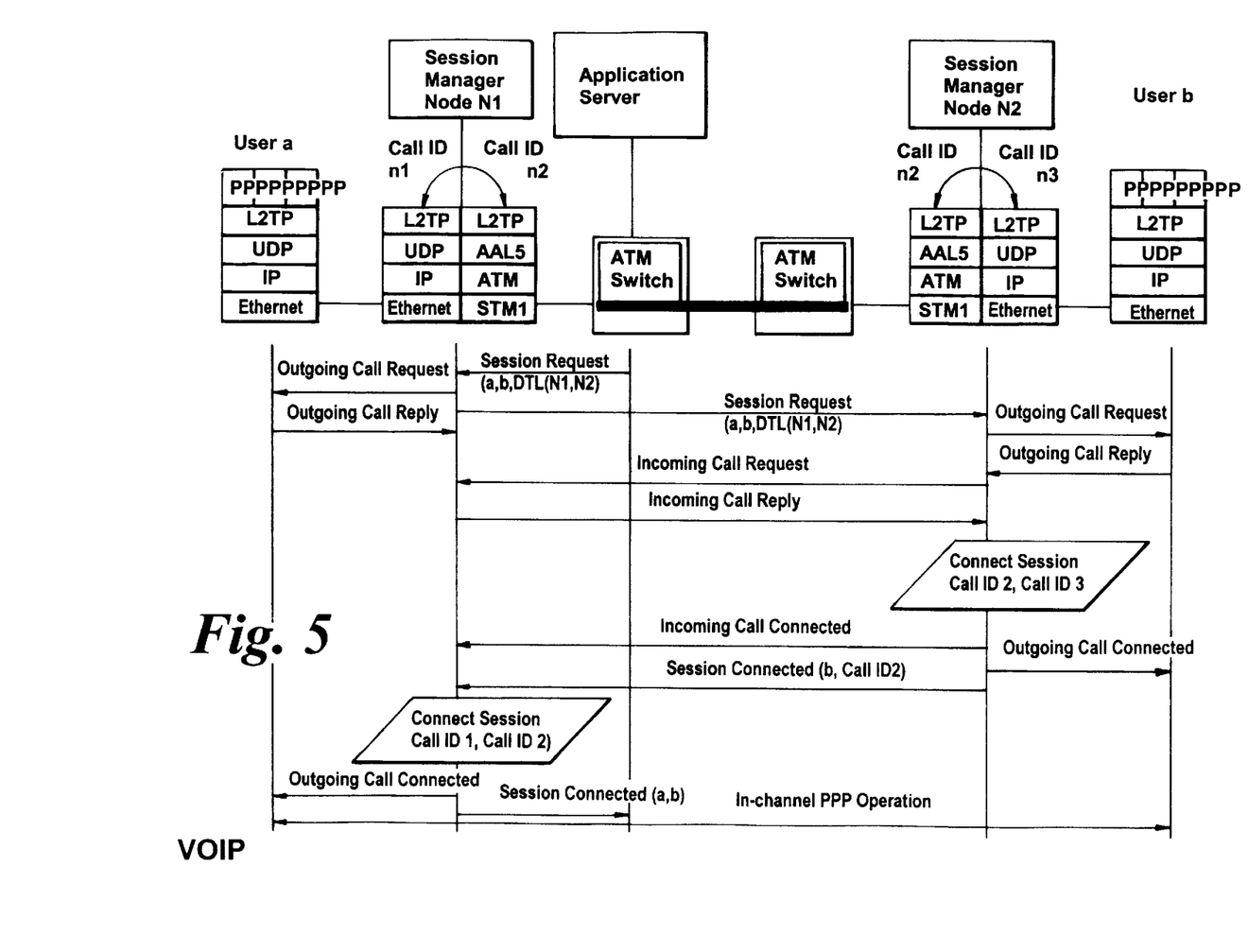
FIG. 5 and the associated flow chart of FIG. 5a together illustrate the establishment of an end-to-end IP (PPP) Session having bandwidth guarantees and enabling the end-to-end operation of standard PPP authentication and encryption protocols.

In the network of FIG. 5, each L2TP Tunnel exchanges the standard sequence of messages defined for L2TP; i.e. Call Request, Call Reply and Call Connected. These messages may relate to outgoing calls or incoming calls. The session managers link the partial PPP sessions on each tunnel in order to provide an end to end PPP session via the tunnel.

Figure 6:
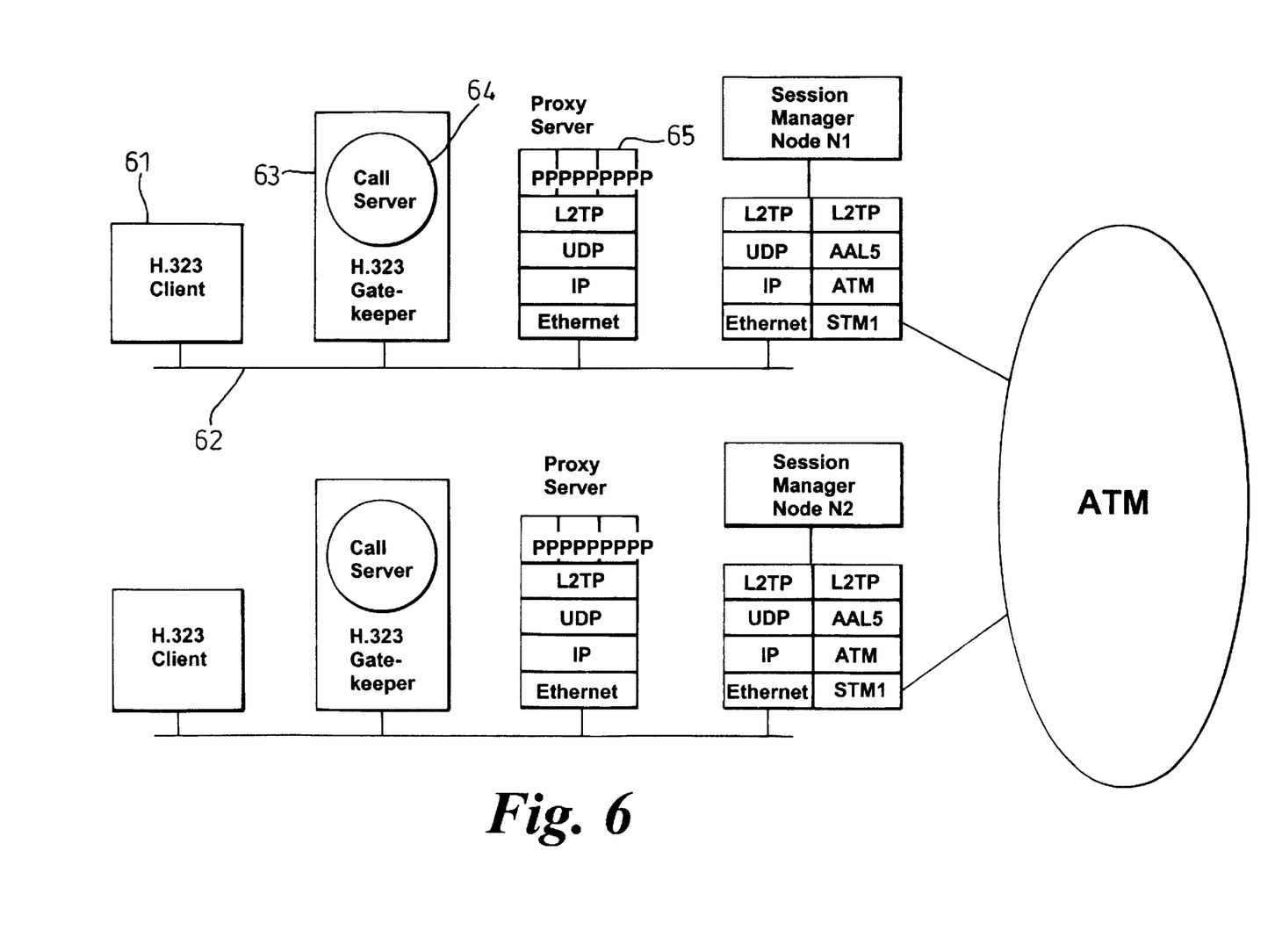
FIG. 6 illustrates the IP Network Configuration of this invention.

In FIG. 6 a preferred network configuration that exploits the capabilities of the tunnel network of FIG. 5 to deliver voice over IP services is shown. A number of H.323 client terminals 21 operate on a LAN together with an H.323 gatekeeper 22, a number of proxy servers 23 and a tunnel switch 24. The proxy servers 23 act as the endpoints of the tunnels so that the H.323 client terminals are not restricted in the applications that they can support in addition to the H.323 client. Advantageously, each gatekeeper 22 incorporates a call server function 25 which is able to operate SS7 signalling with other gatekeepers or with PSTN/ISDN switches (not shown) in the external network.

Figure 7:
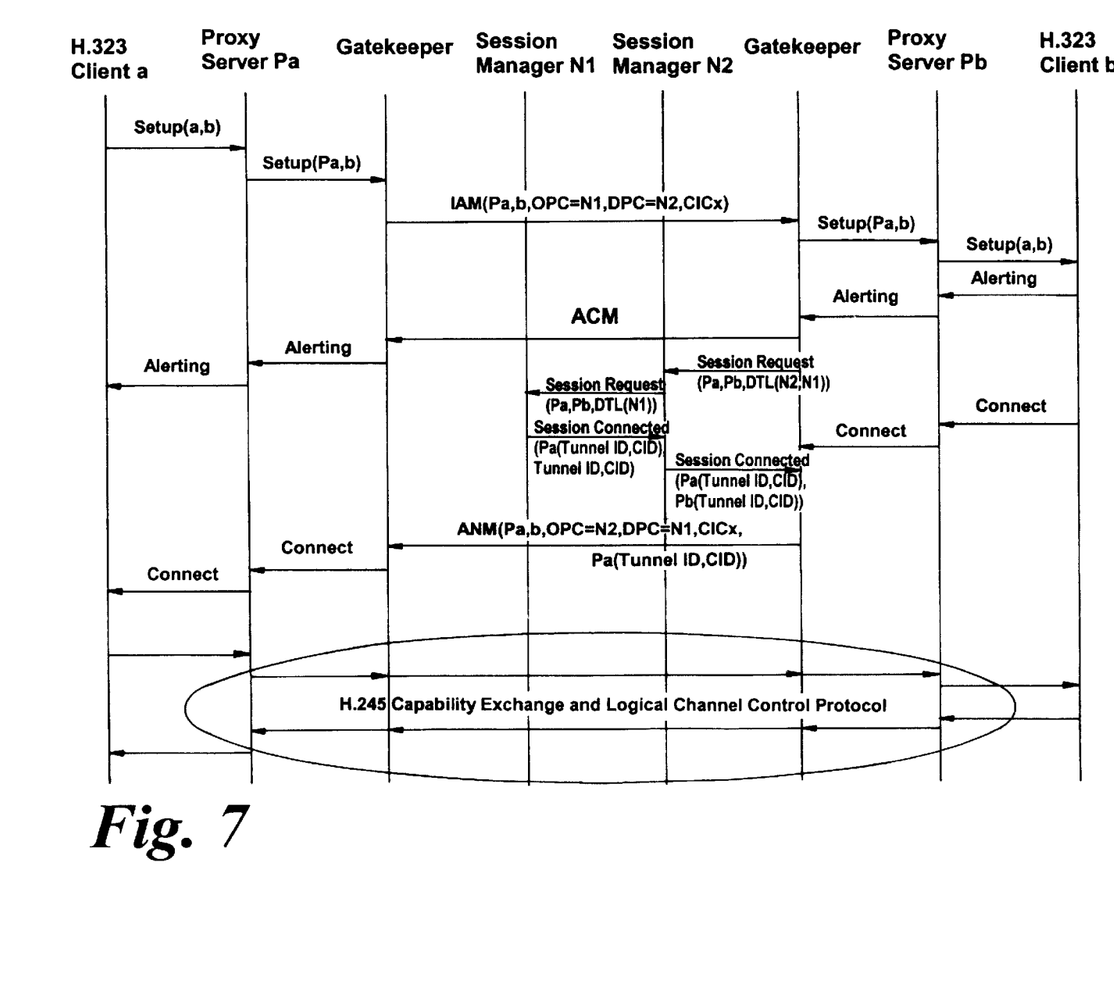
FIG. 7 shows a message sequence chart for the establishment of a successful call between two Voice over IP terminals.

The message sequence chart of FIG. 7 illustrates the end to end operation for a successful call set up in the network of FIG. 6. As shown in FIG. 7, H.323 clients (user terminals) with E164 numbers A and B have respective proxy servers with E164 numbers $P_A$ and $P_B$ where A and P are algorithmically related. As shown in FIG. 7, user terminal A sends a set-up message (set-up (A,B)) for a cal to user terminal B. This message is converted by the gatekeeper associated with the user terminal A into an SS7 initial address message (IAM) (IAM($P_A$,B,OPC=N1,DPC=N2,ClCx) in which the originating point code (OPC) and destination point code (DPC) designate the respective particular combination of the gatekeeper and the tunnel switch. The circuit identification code designates a PPP (point to point protocol) session that is to be created on an L2TP Tunnel between the two tunnel switches. On receipt of the returned alerting message from the called user terminal B in response to the set up request, the terminating gatekeeper requests a PPP session. This proceeds as described with reference to FIG. 7. The PPP session identifier of the proxy server $P_A$ (Tunnel ID, Call ID) is passed back to the terminating gatekeeper. This information is also passed to the originating gatekeeper as user to user information in the SS7 answer message ANM. This information allows the originating gatekeeper to complete the end to end connection. The L2TP signaling sequences exchange physical channel identifiers, typically IP addresses to enable packets to be exchanged between proxy servers.

Following the set-up of the connection, H.245 capability messages are exchanged followed by requests to establish logical channels for communication. Advantageously, the H.245 messages are exchanged via the gatekeepers so that bandwidth accounting on the tunnels between the tunnel switches is possible.

The media channels are routed end to end via the proxies using the IP addresses exchanged during set-up of the PPP sessions.

The L2TP tunnel between the two tunnel switches behaves as an SS7 trunk group. The gatekeepers at either end of the tunnel are able to control the number of calls admitted allowing the network to be dimensioned for a grade of service as in normal telephony where all calls accepted have a guaranteed quality of service. The gatekeepers are also able to account for the total media components set up on the tunnel, this allows the available bandwidth to be dynamically shared amongst users and controlled by policies which can be based on congestion, user priorities and etc.

It will be understood that the above description of a preferred embodiment is given by way of example only and that various modifications may be made by those skilled in the art without departing from the spirit and scope of the invention.

We claim:

1. An arrangement for establishing an end to end connection to provide voice and media services between first and second terminals each having a respective proxy server over an IP (Internet protocol) network via first and second nodes, each incorporating a gatekeeper and a session manager, and in which connection oriented traffic is transported in tunnels via said first and second nodes, the proxy servers acting as the end points of said tunnels, the arrangement comprising means for providing signalling between said nodes, means for multiplexing the voice and media components to form a point to point protocol (PPP) session, and means for switching said PPP session end to end across the network under the control of said signal line wherein, to establish a said connection:

said fist terminal sends a setup message via said proxy servers to the second terminal via the first and second nodes;

said second terminal, returns an alerting message to the first terminal via the second and first nodes, the gatekeeper of the second node sends a session request via the session manager of that node to the session manager of the first node;

the session manager of the first node sends to the gatekeeper of the second node a session connected message containing a tunnel identifier and circuit identifier;

the gatekeeper of the second node sends an answer message to the gatekeeper of the first node confirming connection of the session; and the gatekeeper of the second node sends a connect message to the first user terminal so as to complete the end to end connection.

2. An arrangement as claimed in claim 1, wherein said tunnels comprise Layer 2 Tunnelling Protocol (L2TP) tunnels and Multi Protocol Label switched tunnels.

3. An arrangement as claimed in claim 2, wherein the number of calls admitted to a said tunnel is controlled so as to ensure that all calls admitted to that tunnel have a guaranteed quality of service.

4. An arrangement as claimed in claim 3, wherein each said gatekeeper incorporates a call server function.

5. An arrangement as claimed in claim 4, wherein said nodes are arranged to exchange topology state packets so as to provide each said node with information on bandwidth availability.

6. A method as claimed in claim 2, wherein said tunnels are established over an asynchronous transfer mode (ATM) network.

7. A method as claimed in claim 6, wherein said first and second nodes exchange topology state packets identifying the network topology and reporting on available bandwidth.

8. A method of setting up an end to end connection to provide voice and media services between first and second terminals each having a respective proxy server over an IP (Internet protocol) network via first and second nodes, each incorporating a gatekeeper and a session manager, and is which connection oriented traffic is transported in tunnels via said first and second nodes, the proxy servers acting as the end points of said tunnels, in which signalling is provided between said nodes, in which the voice and media components are multiplexed to form a point to point protocol (PPP) session, and in which said PPP session is switched end to end across the network under the control of said signalling, wherein the method comprises:

sending a setup message via said proxy servers from the first terminal to the second terminal via the first and second nodes;

at the second terminal, returning an alerting message to tie first terminal via the second and first nodes, at the gatekeeper of the second node, sending a session request via the session manager of that node to the session manager of the first node;

at the session manager of the first node, sending to the gatekeeper of the second node a session connected message containing a tunnel identifier and circuit identifier;

at the gatekeeper of the second node, sending an answer message to the gatekeeper of the first node confirming connection of the session; and at the gatekeeper of the second node, sending a connect message to the first user terminal so as to complete the end to end connection.

9. A method as claimed in claim 8, wherein said tunnels comprise Layer 2 Tunnelling Protocol (L2TP) tunnels and Multi Protocol Label switched tunnels.

10. A method as claimed in claim 9, wherein the number of calls admitted to a said tunnel is controlled so as to ensure that all calls admitted to that tunnel have a guaranteed quality of service.

11. A method as claimed in claim 10, wherein each said gatekeeper is provided with a call server function.

12. A method as claimed in claim 11, wherein topology state packets are exchanged between said nodes so as to provide each said node with information on bandwidth availability.

13. A method of setting up an end to end connection to provide voice and media services between first and second terminals each having a respective proxy server over an IP (Internet protocol) network via first and second nodes each incorporating a gatekeeper, a tunnel switch and a session manager, and in which connection oriented traffic is transported in tunnels via said first and second nodes, the proxy servers acting as the end points of said tunnels, in which signalling is provided between said nodes, in which the voice and media components are multiplexed to form a point to point protocol (PPP) session, and in which said PPP session is switched end to end across the network under the control of said signalling wherein the method comprises:

sending a setup message via said proxy servers from the first terminal to the first node;

at the gatekeeper of the first node, converting the setup message into a signalling message containing an originating point code designating the gatekeeper and tunnel switch of the first node, a destination point code designating the gatekeeper and tunnel switch of the second node, and a circuit identification code designating a point to point protocol (PPP) session to be established in a tunnel between said tunnel switches, and sending the signalling message to the second node;

at the gatekeeper of the second node, relaying the call setup message to the second terminal;

at the second terminal, sending an alerting message to the first terminal via the first and second nodes;

at the gatekeeper of the second node, sending a session request incorporating a session identifier of the proxy server of the first terminal via the session manager of that node to the session manager of the first node;

at the session manager of the first node, sending to tile gatekeeper of the second node a session connected message containing a tunnel identifier and circuit identifier;

at the gatekeeper of the second node, sending an answer message to the gatekeeper of the first node confirming connection of the session; and at the gatekeeper of the second node, sending a connect message to the first user terminal so as to complete the end to end connection.

\* \* \* \* \*

UNITED STATES PATENT AND TRADEMARK OFFICE
CERTIFICATE OF CORRECTION

PATENT NO. : 6,507,577 B1
DATED : January 14, 2003
INVENTOR(S) : Mauger et al.

It is certified that error appears in the above-identified patent and that said Letters Patent is hereby corrected as shown below:

Column 7,
Line 52, "signal line" should read -- signaling --.
Line 54, "fist" should read -- first --.

Signed and Sealed this

Sixth Day of April, 2004

JON W. DUDAS
*Acting Director of the United States Patent and Trademark Office*